Feb. 13, 1934. A. C. ROWLEY 1,947,309
VALVE FOR FIRE EXTINGUISHING SYSTEMS
Filed April 24, 1931 3 Sheets-Sheet 1
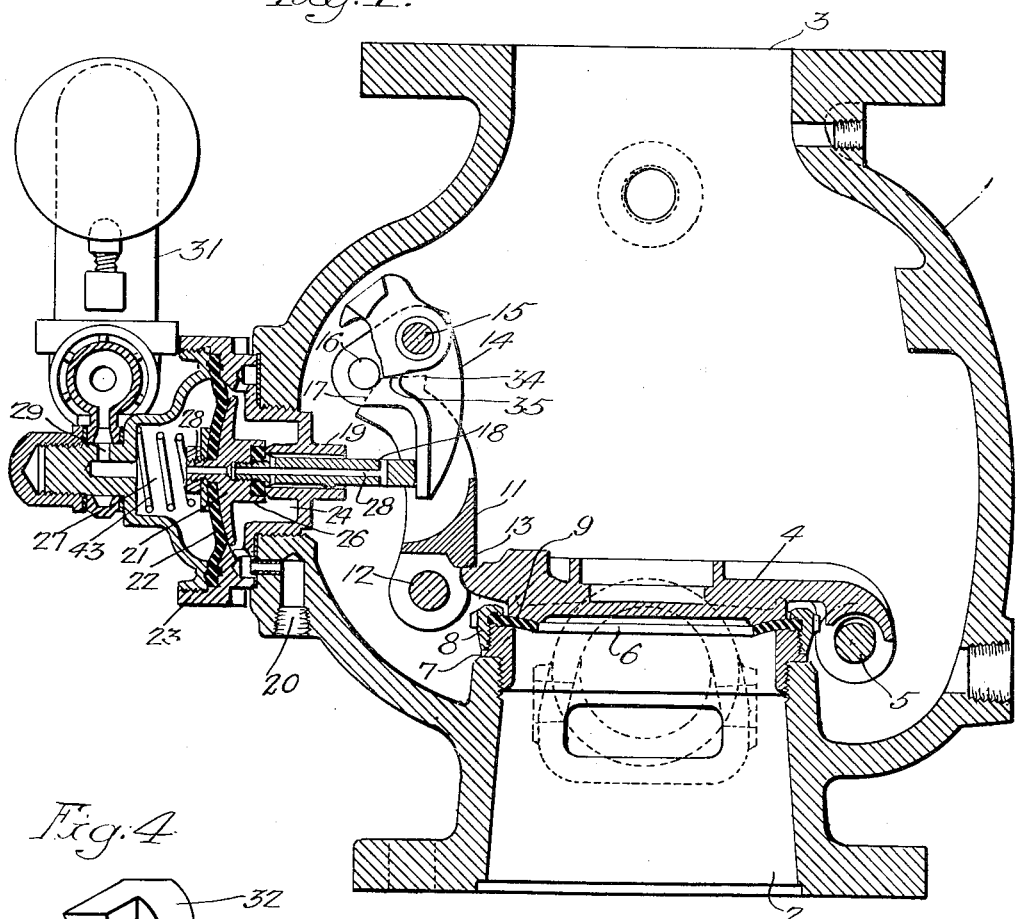
Fig.1.
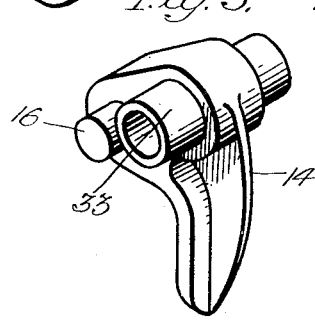
Fig.4.
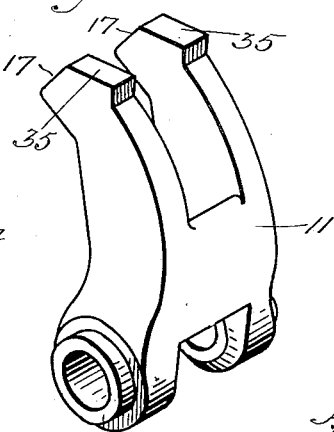
Fig.5.
Fig.6.
Inventor:
Arthur C. Rowley
by his Attorneys
Howson & Howson Feb. 13, 1934.  A. C. ROWLEY  1,947,309
VALVE FOR FIRE EXTINGUISHING SYSTEMS
Filed April 24, 1931  3 Sheets-Sheet 2

Feb. 13, 1934.  A. C. ROWLEY  1,947,309
VALVE FOR FIRE EXTINGUISHING SYSTEMS
Filed April 24, 1931  3 Sheets-Sheet 3
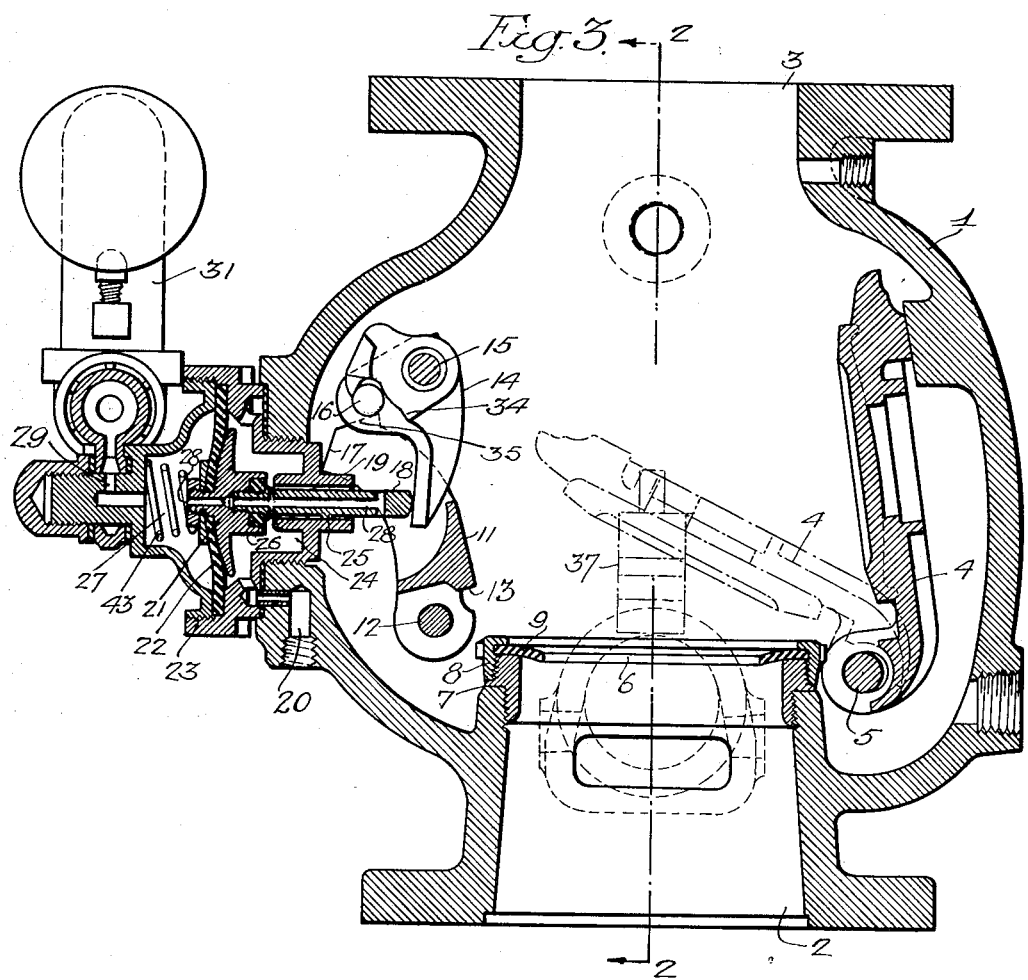

Patented Feb. 13, 1934

1,947,309

UNITED STATES PATENT OFFICE 1,947,309

VALVE FOR FIRE-EXTINGUISHING SYSTEMS

Arthur C. Rowley, Philadelphia, Pa., assignor to Globe Automatic Sprinkler Company, Philadelphia, Pa., a corporation of Pennsylvania Application April 24, 1931. Serial No. 532,571

6 Claims. (Cl. 251—167)

This invention relates to improvements in valves, and more particularly to a type of valve adapted for use in dry pipe fire-extinguishing systems.

An object of the invention is to provide a valve of the stated type that shall be relatively simple in form and of low manufacturing cost.

Another object of the invention is to provide a valve so constructed as to avoid necessity for expensive machine operations in the course of manufacture and which shall be in effect automatically self-seating.

The invention further resides in certain novel and improved structural features and details hereinafter set forth and illustrated in the attached drawings, in which:

Figure 1 is a sectional view of a valve made in accordance with my invention showing the valve seated;

Fig. 3 is a sectional view similar to Fig. 1 but showing the valve in an elevated or unseated position, and Figs. 4, 5, and 6 are views in perspective of elements of the latching mechanism.

Figure 2:
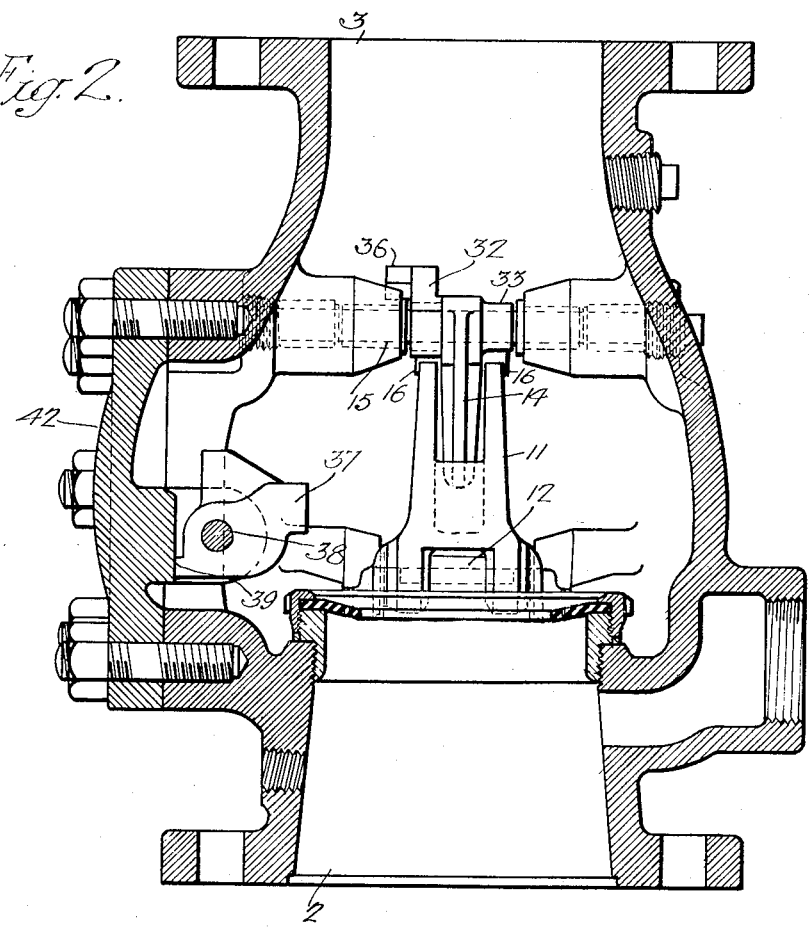
Fig. 2 is a sectional view on the line 2—2, Fig. 3.

With reference to the drawings, a valve made in accordance with my invention comprises a casing 1, this casing having a port 2 adapted for connection to a water main and a port 3 for connection with a dry pipe or other fire-extinguishing system. The port 2 is normally closed by a valve comprising a clapper 4 pivotally mounted at 5 within the casing, this clapper normally resting upon a rubber or other suitable annulus 6 which constitutes the valve seat. In the present instance, the element 6 is confined between a sleeve 7 threaded into the casing at the upper end of the port 2 and a flange 8 which is threaded onto the said sleeve 7. The clapper is provided on its under side with an annular surface 9 which is adapted to rest snugly against the annulus 6 as illustrated in Fig. 1, thereby effectively closing the port 2.

In accordance with my invention, the valve clapper 4 is provided with a positive locking means, this means comprising in the present instance a bifurcated lever 11, pivotally mounted within the housing upon trunnions 12, this lever having a shoulder 13 which is adapted in predetermined position of the lever, as shown in Fig. 1, to overlie the edge of the clapper 4 to thereby hold the latter securely in the seated or port-closing position. To normally retain the lever 11 in the said clapper-locking position, I provide a latch element 14 which is pivotally mounted upon a rod 15 within the housing and which has at each side a transversely projecting pin 16 which by engaging the terminal faces 17 of the two arms of the lever 11 hold the latter in the upright or clapper-locking position, see Fig. 1. The latch 14 is normally retained in the lever-locking position by a plunger 18 slidably mounted in a boss 19 in the housing, the outer end of the plunger 18 being threaded into an element 21 which is attached to a flexible diaphragm 22 secured at its periphery in a casing extension 23. The extension 23 which includes the boss 19 forms in effect a chamber distinct from the main casing chamber and divided by the flexible diaphragm 22. That portion of the chamber immediately adjacent the housing and designated by the reference numeral 24 is constantly in communication with the atmosphere through a port 20, and is adapted for communication with the main casing chamber through a passage formed between the outer surface of the plunger 18 and the inner surface of the boss 19, the plunger 18 being of lesser diameter than the guide passage in the boss 19 in which it operates, and it will be noted further that the plunger 18 is provided with projections 25 which act to center the plunger in the said guide passage. The chamber 24 is normally separated from the main valve chamber, however, by the element 21 which is adapted to function as a valve closing the inner end of the guide passage through the boss 19. For this purpose, the inner end of the member 21 is provided with a rubber or other suitable insert 26 which engages the outer end of the boss 19 and forms a seal therewith.

The outer portion of the chamber in the casing extension 23, designated by the reference numeral 27, is normally in communication with the main valve chamber of the casing 1 through a passage 28 which extends through the plunger 18 and continues through the member 21. The sub-chamber 27 is also adapted for connection through a port 29 with pressure release means, one form of which is indicated generally at 31, whereby the pressure in the chamber 27 may be exhausted for a purpose hereinafter set forth.

Also for a purpose hereinafter made clear, an auxiliary latch 32 is mounted upon one of the cylindrical bearing bosses 33 of the latch 14, the element 32 normally assuming a position as shown in Figs. 1 and 2 wherein the lower projecting portion 34 rests upon the terminal end surface 35 of one of the arms of the lever 11. The element 32 also has a transverse projection 36 which when the element is depressed is adapted to engage the underlying pin 16 of the latch 14, as shown in Fig. 3, this depressed position of the element 32 bringing the projection 34 into a position wherein it lies in the path of the upper end of one of the arms of the lever 11 and acts as a stop limiting the movement of this lever towards the clapper. Another latch is provided, see Fig. 2, for preventing the clapper, when the latter is once fully opened as shown in Fig. 3, from falling back to its seat, this latch which is designated by the reference numeral 37 being pivotally mounted within the casing at 38 in the path of the clapper. The latch is free to turn in the counterclockwise direction, see Fig. 2, to permit passage of the clapper in opening, but is prevented from moving in the reverse direction by a shoulder 39 which engages the side of the casing. This latch is supported by gravity in the position shown in Fig. 2, and as set forth above prevents return of the clapper to its seat following actuation.

In operation of the valve in conjunction with a dry pipe system, the valve chamber above the clapper is filled with air under pressure, which air also fills the dry pipe system, which as previously set forth communicates with the port 3. This pressure is transmitted through the passage 28 of the plunger 18 and the member 21 to the chamber 27, but is prevented from reaching the chamber 24 by the valve 26. The chamber 24 being in communication with the atmosphere or other low pressure exhaust area, the pressure in the chamber 27 acting upon the diaphragm 22 holds the latter in an advanced position as shown in Fig. 1, closing the passage through the boss 19 and through the plunger 18 holding the latch 14 in the advanced position locking the lever 11 in the position shown in Fig. 1 in which it holds the clapper 4 to its seat. The air pressure exerted directly upon the clapper 4 and upon the latching mechanism through the diaphragm 22 and the associated parts is sufficient to prevent opening of the clapper under pressure from the water main applied through the port 2. If now the pressure in the chamber 27 is exhausted at a rate more rapid than the transfer of pressure from the valve casing to the chamber 27 through the restricted passage 28, the resulting relative reduction of pressure in the chamber 27 permits a retractive movement of the diaphragm 22 and release of the latch 14, such release permitting in turn a retractive movement of the lever 11 and release of the clapper 4, which is thrown by pressure of the entering water to the position shown in Fig. 3, the latch 37 functioning as previously set forth to prevent reseating of the clapper.

Particular attention is directed to the novel method of seating the clapper 4. By use of the flexible element 6 which is so arranged that its free inner peripheral edge is engageable with the clapper when the latter is in the normal seated position, advantage is taken of the fluid pressure which tends to unseat the valve to create a substantially positive seal at the valve seat, and this seal is obtained without necessity for the careful fitting and machine work which is normally required in a valve of high efficiency. The device is of particular value in connection with valves for fire-extinguishing systems, for which purpose it has been necessary heretofore to use valves of relatively expensive character.

There may be other modifications without departure from the invention.

I claim:

1. In a valve structure, a valve element and a seat therefor, said element being adapted for displacement from its seat by a predominating fluid pressure on the seating side thereof, means for normally retaining the valve element seated against said pressure, and flexible means secured to the seat and engageable with the said element when seated, said means being operative by said pressure to seal the valve.

2. In a valve structure, a valve element and a seat therefor, said element being adapted for displacement from its seat by a predominating fluid pressure on the seating side thereof, means for normally retaining the valve element seated against said pressure, and flexible means operative at the seating side of said valve and by said pressure for sealing the valve around the seat opening.

3. In a valve structure, a valve element and an element constituting a seat for said valve, and a flexible member on one of said elements positioned for engagement with the other of said elements, said member when the valve is seated being exposed to fluid pressure on the seating side of and tending to unseat the valve, whereby said pressure is effective to force the member against the said other element to seal the valve around the seat opening.

4. In a valve structure, a valve element, a seat element for said valve, and a retaining member for holding said valve element to its seat against fluid pressure on the seating side of the valve, and a flexible valve-sealing member secured to one of said elements and having a free edge exposed to said pressure and adapted to be forced thereby into sealing engagement with the other of said elements.

5. In a valve structure, a valve element and an element constituting a seat for said valve, and a flexible rubber sealing member engaging one of said elements and arranged when the valve is seated to engage the other element and constituting in effect a gasket between said elements, said member being attached to one of said elements and having a free edge exposed to fluid pressure on the seating side of and tending to unseat the valve whereby said edge is forced into sealing engagement with the other of said elements.

6. In a valve structure, a valve element, a seat element for said valve, and a flexible sealing ring secured in the seat element and having a free edge projecting in proximity to the seating side of the valve when the latter is seated, said free edge being adapted to be pressed by fluid pressure tending to unseat the valve into sealing engagement with the latter.

ARTHUR C. ROWLEY.